D.-C. STABILIZED AMPLIFIERS

Filed Oct. 19, 1955 2 Sheets-Sheet 1

INVENTOR.
ALLEN A. BARCO
BY [signature]
ATTORNEY

May 3, 1960 — A. A. BARCO — 2,935,556

D.-C. STABILIZED AMPLIFIERS

Filed Oct. 19, 1955 — 2 Sheets-Sheet 2

INVENTOR.
ALLEN A. BARCO
BY
[signature]
ATTORNEY 2,935,556

D.-C. STABILIZED AMPLIFIERS

Allen A. Barco, Princeton Junction, N.J., assignor to Radio Corporation of America, a corporation of Delaware Application October 19, 1955, Serial No. 541,393

4 Claims. (Cl. 178—5.4)

The present invention relates to circuits for stabilizing the D.-C. operating point of the electron tubes in amplifiers, and more particularly, to color difference signal amplifiers.

The drift of the direct current operating point in electron tube devices may be attributed to variations in the equivalent impedance and in the contact potential associated with the cathode and the first control electrode of the electron tube device.

The cathode of an electron tube device such as an amplifier tube, may be represented by an impedance between the emitting surface of the cathode and the cathode lead. This impedance is the result of the electrical conduction characteristics of the cathode oxide and the base metal of the cathode structure. A voltage constituting a contact potential is developed between the cathode and the current controlling element. Cathode aging and variation in cathode temperature cause variation in the value of the impedance between the emitting surface of the cathode and the cathode lead. Variation in the resistive component of the internal impedance of the cathode also produces a variation in the potential between the emitting surface of the cathode and the current controlling electrode such as the first control grid. Additional changes in the effective potential between the emitting surface of the cathode and the control grid are produced by variation of the contact potential which is a function of the cathode temperature.

In many types of communication circuits it is important that amplifiers be controlled so that tube aging or the replacement of tubes, or the changing of cathode temperature does not change the gain and transfer characteristics of the amplifier. This is particularly true in computer circuits where signals representing computer information must be transferred with considerable accuracy from one portion of a computer circuit to another.

Drift in the D.-C. operating point of amplifier tubes must be prevented in the color difference signal amplifier of color television receivers where a plurality of demodulated color difference signals are utilized to drive a color image reproducer. Should the amplitude of one or more of the color difference signals applied to the color image reproducer change because of the aforementioned drift in D.-C. operating point of an associated amplifier tube, considerable deterioration in the color balance and color content of the reproduced color image will be experienced.

It is an object of this invention to produce an amplifier which is stabilized against drift in D.-C. operating point.

It is another object of this invention to D.-C. stabilize color difference signal circuits of a color television receiver.

It is a further object of this invention to prevent the deterioration of a reproduced color image as a result of tube aging.

According to the invention, the D.-C. operating point of an electron tube is stabilized against changes due to cathode aging and variations in cathode temperature by pulsing the first control grid by way of a condenser to develop a grid bias across the condenser due to current drawn to the control grid by the pulses. The current of the electron tube is maintained constant during the pulses applied to the control grid by pulsing at least a second electrode such as an anode with a pulse of prescribed amplitude and polarity during the intervals that pulses are applied to the control grid.

Other and incidental objects of this invention will become apparent upon a reading of the following specification and a study of the drawings, where:

Figures 1, 2:
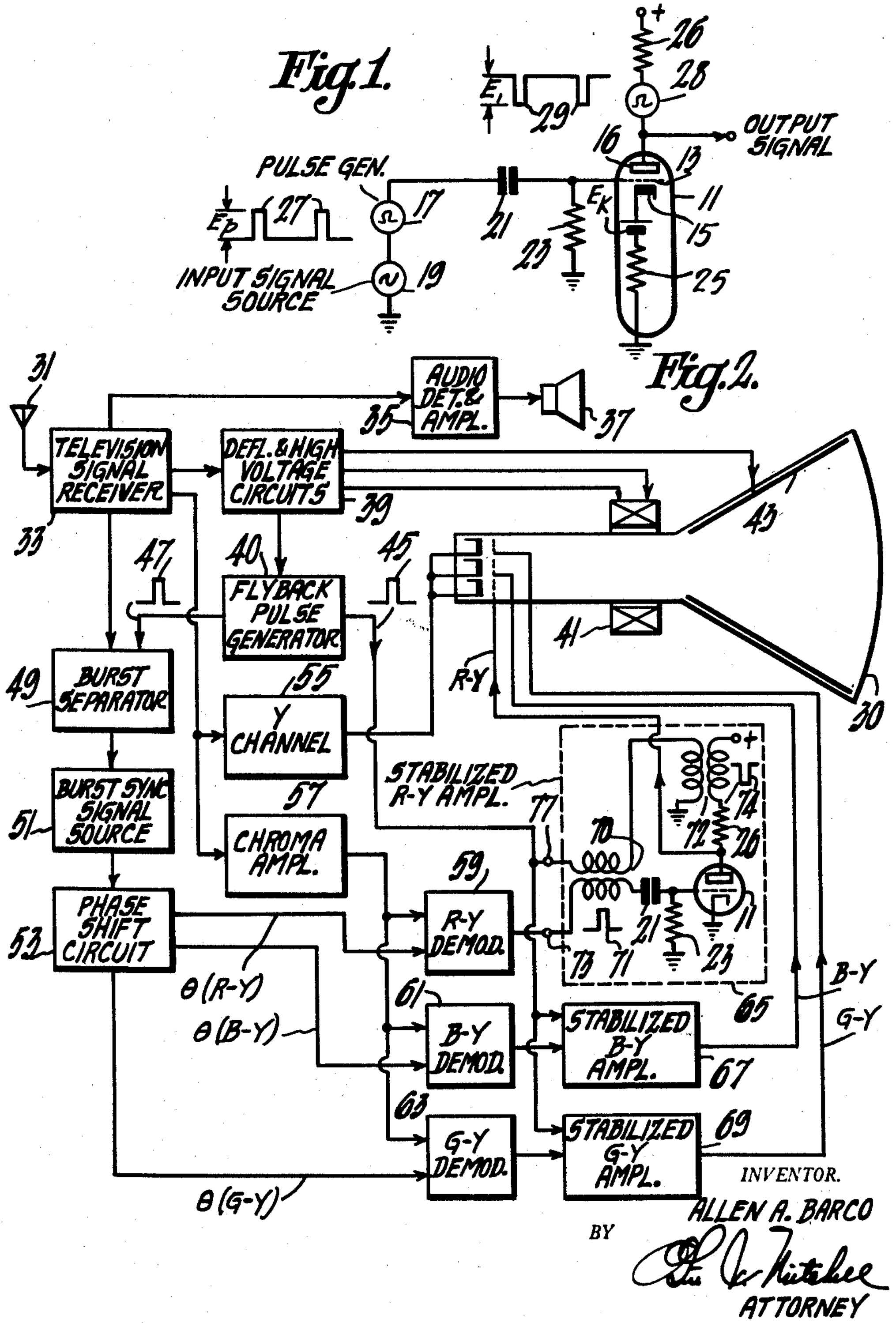
Figure 1 is a schematic diagram of one form of the present invention.
Figure 2 is a block diagram of a color television receiver including a schematic diagram of a color difference signal amplifier which is stabilized according to the present invention.

The amplifier circuit of Figure 1 has its D.-C. operating point stabilized in accordance with the present invention. The amplifier utilizes an amplifier tube 11 having a control grid 13, a cathode 15 and an anode 16. In the form of the invention shown in Figure 1, an input signal source 19 is coupled to the control grid 13 by way of the pulse generator 17 and the condenser 21. A resistor 23 is coupled between the control grid 13 and ground.

Resistance 25 is coupled between the cathode 15 and ground. The contact potential $E_k$ is equivalently represented as a series potential source between the cathode 15 and the resistor 25.

The potential $E_k$ represents the effective potential between the grid and cathode caused by the emission velocity of the electrons leaving the cathode and the sum of the contact potentials around the grid-to-cathode electrical circuit. The resistor 25 represents the total D.-C. resistance between the cathode pin of the tube and the emitting surface of the cathode. Physically, this resistor 25 represents two components; first, a resistive layer which develops in the interface between the base metal of the cathode and the oxide coating and, second, a resistance within the oxide coating itself. Plate current flowing through the internal cathode resistance produces a voltage drop which adds to the contact potential and external grid bias. The development of this internal cathode resistance causes the apparent "lack of emission" and loss of measured transconductance in a "weak" tube.

Cathode behavior is greatly influenced by variations in the manufacturing process. The value of the cathode resistance will increase with time after an initial period, and will ultimately render the tube useless. To mention a few examples, a 6U8 taken from a sync generator after 1800 hours of service measured "weak" on a gm. meter and had developed 1100 ohms of cathode resistance. A 12BH7, after 800 hours of operation on a life test, showed 342 ohms of cathode resistance, while another, taken from the same lot of the same manufacturer, showed only 25 ohms. Both tubes had substantially no cathode impedance at the beginning of the test. After 800 hours of life test, one section of a dual triode showed 255 ohms of resistance in the cathode and the other 157 ohms. If these two triode sections had been used as color difference amplifiers supplying two grids of a tri-color kinescope, the resulting shift in kinescope white balance would have been intolerable.

The plate circuit of the electron tube 11 consists of the plate resistor 26 and the pulse generator 28 coupled in series between the source of high voltage and the plate 16. Pulse generator 17 and pulse generator 28 each produce a series of intermittent pulses, the pulses from each generator being substantially in time coincidence. The pulses provided by the pulse generator 17 are given the numeral 27. These pulses have an amplitude $E_p$ and are applied with positive polarity through condenser 21 to the control grid 13. The pulses 29 provided by the pulse generator 28 in the circuit of the plate 16 have negative polarity and have an amplitude $E_1$.

When each of the pulses 27 are applied to the control grid 13 of the electron tube 11, the control grid 13 draws current and charges the condenser 21 to a potential equal to the amplitude of the pulses 27, namely, $E_p$. The effective grid bias on the electron tube 11 will thereupon be dependent only on the amplitude of the pulses 27 and will be independent of the variation in cathode impedance, tube and cathode aging, and contact potential.

While current is being drawn to the control grid 13 during each of the pulses 27, at least two effects can take place in the circuit of the electron tube 11. One effect occurs due to voltage drop across the effective resistance of the cathode emitting surface by the current which passes to the control grid 13 during each of the pulses 27; this voltage drop produces a positive pulse across the internal cathode impedance which reduces the effective pulse height and places the grid at an incorrect bias. The other effect is one whereby the current through the electron tube 11 and through the plate resistor 26 will be greatly increased during each pulse 27 due to the fact that the control grid is driven positive. The pulses 29 which are of negative polarity and which are applied to the plate 16 during each pulse 27 by the pulse generator 28 connected to the plate 16 will thereupon reduce the current flowing through the plate resistance 26 during each pulse 27, and by proper choice of the value of pulse potential $E_1$ each pulse 29 may be utilized to keep the current through the electron tube 11 substantially constant as the control grid 13 draws current. In addition, the pulsing of the plate 16 by each pulse 29 will have the additional effect of offsetting the voltage drop across the effective resistance of the cathode emitting surface of cathode 15 thereby causing the grid bias applied to the control grid 13 to be $E_p$, and not $E_p$ reduced by the amount of voltage drop produced by the pulse drawn current across the aforementioned effective cathode resistance of the cathode surface of cathode 15.

It is to be appreciated that the circuit of Figure 1 shows only one means of connection to accomplish the present invention. The pulse generator 17 may be installed, for example, in the circuit between the cathode 15 and ground or connected from the control grid 13 to ground. The pulse generator 28 which applies pulses to the plate 16 may, in the case where the electron tube 11 is a pentode, be coupled to a screen or suppressor grid or to any combination of the tube electrodes succeeding the first control grid.

A stabilized amplifier of the present invention is of particular use in a color television receiver. In many types of color television receivers color difference signals are demodulated at low levels and then amplified and applied to appropriate control elements of a color image reproducer. Should the color difference signal amplifiers not be D.-C. stabilized, variations in gain or D.-C. operating point will cause unbalance of the color information applied to the color image reproducer thereby resulting in deterioration of the quality of the reproduced image.

Figure 2 is a block diagram of a color television receiver which utilizes the present invention for stabilizing the amplifiers which apply the color difference signals to the color kinescope 30. Consider first the overall operation of the color television receiver diagrammed in Figure 2. The incoming signal from the broadcast transmitter is received at the antenna 31 and applied to the television signal receiver 33. The television signal receiver 33 demodulates a composite color television signal which includes a luminance signal, a chrominance signal, deflection and color synchronizing signals, and a sound modulated carrier which is transmitted 4½ m.c.s. removed from the picture carrier. The luminance signal contains wide band picture information representative of the monochrome version of the televised image. The chrominance signal includes modulations representative of color difference signals each of which, when demodulated and combined with the luminance signal, produce a component color signal. The color difference signals may be demodulated from the chrominance signal by synchronous demodulation, each color difference signal in the chrominance signal having a phase related to the phase of the color synchronizing signal which is transmitted in the form of a burst on the "back porch" of each horizontal synchronizing pulse.

The sound information is demodulated from the color television signal utilizing, for example, an intercarrier sound circuit, in the audio detector and amplifier 35. The amplified sound signal is applied to the loud speaker 37.

The demodulated color television signal is applied to the deflection and high voltage circuits which apply deflection signals to the deflection yokes 41 and a high voltage to the ultor 43 of the color kinescope 30. The deflection and high voltage circuits 39 also energize the flyback pulse generator which produces a flyback pulse 45 during each retrace interval in addition to a pulse 47 which has a duration interval at least that of the color synchronizing bursts.

The color television signal is applied to the burst separator 49 to which the pulses 47 are also applied. The separated bursts are applied to the burst synchronized signal source 51 which develops a continuous signal during scanning times which has the frequency of the burst and a phase prescribed by the bursts. The output of the burst synchronized signal source 51 is used to drive the phase shift circuit 53 which produces a plurality of demodulating signals having phases corresponding to the color difference signals which are to be demodulated from the chrominance signal. In the circuit of Figure 2, a trio of demodulating signals are produced having phases corresponding to red, blue and green color difference signals, namely, R—Y, B—Y and G—Y color difference signals. The phase of the R—Y color difference signal in the chrominance signal lags the phase of the bursts by 90° with the phases of the B—Y and G—Y color difference signals in the chrominance signal lagging the phase of the R—Y color difference signal by 90° and 213.4°, respectively.

The color television signal is applied simultaneously to the Y channel 55 and the chroma amplifier 57. The Y channel amplifies and delays the wide band color television signal which constitutes principally the luminance signal and applies the luminance signal to the cathodes of the color kinescope 30.

The chroma amplifier 57 filters out the deflection synchronizing pulses and filters and amplifies the chrominance signal portion of the color television signal within desired frequency limits. The output of the chroma amplifier is applied simultaneously to the R—Y demodulator 59, the B—Y demodulator 61 and the G—Y demodulator 63. R—Y, B—Y and G—Y phased demodulating signals are applied respectively to the R—Y demodulator 59, the B—Y demodulator 61 and the G—Y demodulator 63. Each of these demodulators produces the corresponding color difference signal related to the phase of the applied demodulating signal.

The circuit of Figure 2 shows a trio of demodulators being used. In another form of color television receiver, a third color difference signal may be formed by properly matrixing amplitudes and polarities of a pair of demodulated color difference signals.

The R—Y color difference signal is applied through the stabilized R—Y amplifier 65 to a control electrode of the color kinescope 30. In like fashion, the B—Y and G—Y color difference signals are applied through the stabilized B—Y amplifier 67 and the stabilized G—Y amplifier 69, respectively, to corresponding control electrodes of the color kinescope 30. Stabilized amplifiers for each of the three color difference signals prevent variations in gain due to cathode aging and other reasons previously mentioned in the specification. It will be appreciated that without proper stabilization and gain control of the color difference signal amplifiers, the drift of the D.-C. operating point of one or more of these amplifiers will result in deterioration of color unbalance and also shifts in "grey-scale" hue.

The R—Y stabilized amplifier 65, which uses the present invention, functions in the following fashion. The R—Y color difference signal developed by the R—Y color demodulator 59 and provided at the terminal 73 is applied to the control grid of the tube 11 by way of the condenser 21 and the pulse transformer 70. The pulse transformer 72 is coupled in series with the plate resistance 26 between the source of plate voltage and the plate of tube 11. The flyback pulse 45, upon energizing the pulse transformers 70 and 72, develop the pulse 71 at the control grid of tube 11 and the pulse 74 at the plate of electron tube 11. The bias and therefore the D.-C. operating point of the control grid of the electron tube 11 is therefore developed across the condenser 21 in the manner following that described in connection with the circuit in Figure 1. It is to be noted that in television where background information is included in, for example the R—Y color difference signal, the D.-C. operating point will be established at the start of each scanning line and will be re-established at the start of the next scanning line, thereby causing each color difference signal amplifier to start each scanning line at a stabilized D.-C. operating point.

Figure 3:
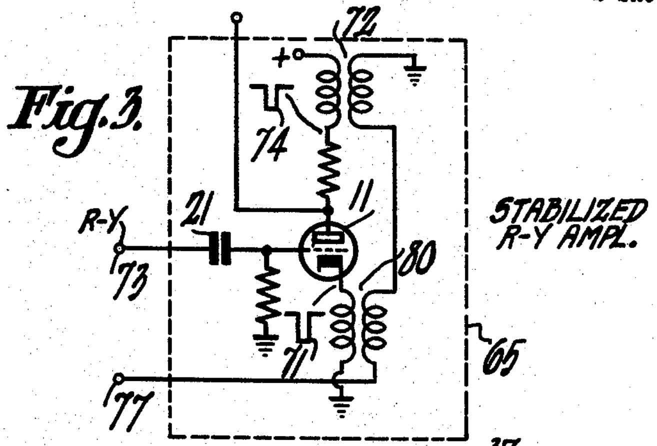
Figure 3 is a schematic diagram of another form of a color difference signal amplifier which is stabilized according to the present invention.

The circuit of Figure 3 shows a stabilized R—Y amplifier 65 employing a type of connection which is somewhat different from that of the stabilized R—Y amplifier of Figure 2. In the circuit of Figure 3, the R—Y color difference signal is applied from the terminal 73 to the control grid of tube 11 by way of condenser 21. A pulse transformer 80 is coupled between the cathode of electron tube 11 and ground. The pulse 71, produced by transformer 80 at the cathode, will have the same effect as the generation of pulse 71 in the grid circuit as shown in the stabilized R—Y amplifier 65 of Figure 2. The circuit includes the pulse transformer 72 which impressses the negative pulses 74 on to the anode of electron tube 11 and functions in the manner previously described in connection with the circuit of Figure 1.

Figure 4:
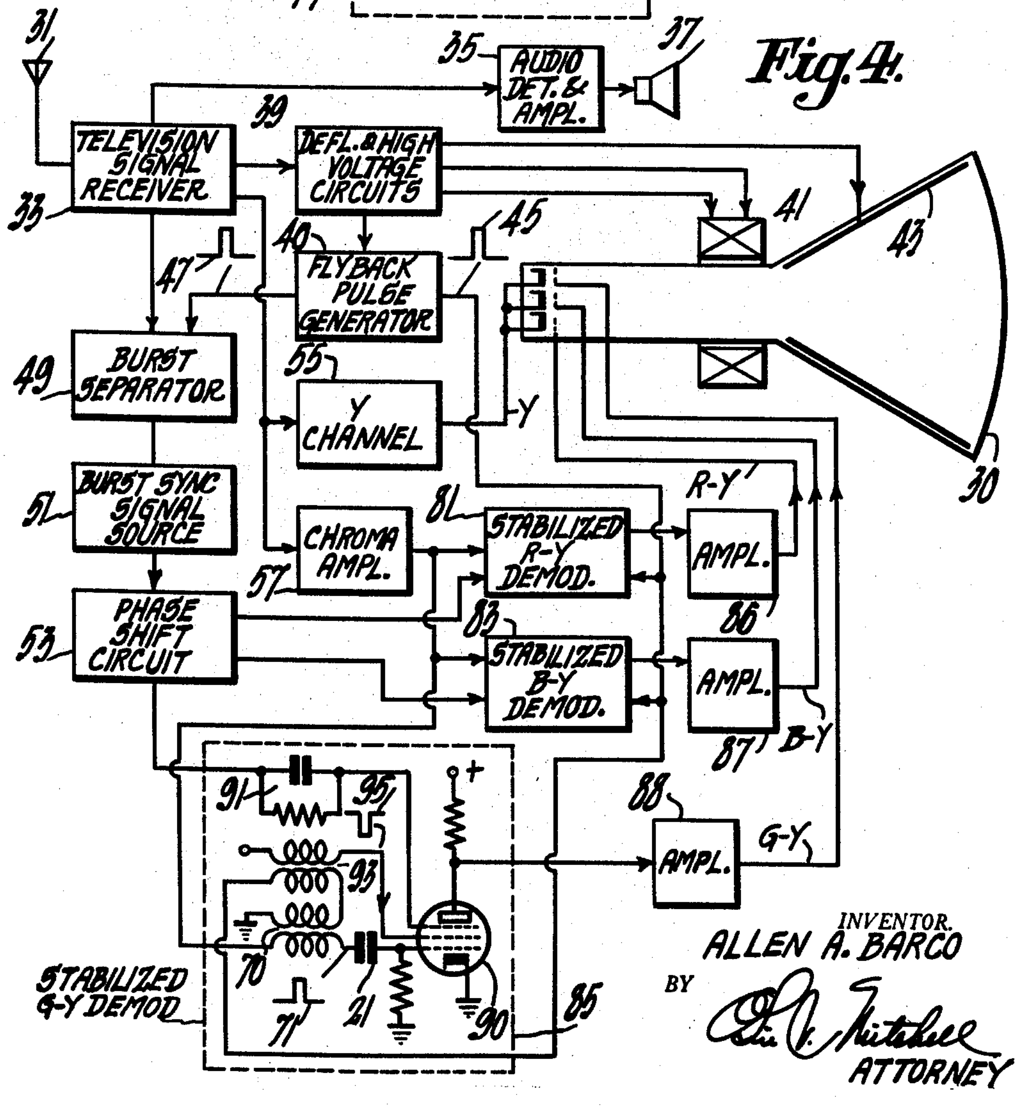
Figure 4 is a block diagram of a color television receiver including a schematic diagram of a demodulator which is stabilized according to the present invention.

The color television receiver whose block diagram is shown in Figure 4 employs the present invention in the demodulator which demodulates the color difference signal from the chrominance signal. Circuits which provide similar functions as those described in Figure 2 are assigned the same numerals and the same legends in the circuits of the color television receiver of Figure 4.

The chrominance signal from the chroma amplifier 57 applies the chrominance signal simultaneously to the stabilized R—Y demodulator 81, the stabilized B—Y demodulator 83 and the stabilized G—Y demodulator 85. The R—Y, B—Y and G—Y color difference signals provided by these stabilized demodulators are amplified in the amplifiers 86, 87 and 88 respectively and applied to the control electrodes of the color kinescope 30.

The stabilized G—Y demodulator functions in the following fashion. A multi-electrode tube 90 is utilized. The chrominance signal is applied to the first control grid of the tube 90 by way of the pulse transformer 70 and the condenser 21. The demodulating signal having the G—Y phase is applied from the phase shift circuit 53 to the third control grid of tube 90 by way of the grid leak circuit 91. The grid leak circuit 91 will cause tube 90 to operate class C. Interaction of the chrominance signal and the G—Y phase demodulating signal will provide a demodulated G—Y color difference signal which is thereupon applied to the amplifier 88 and therefrom to the corresponding control electrode of the color kinescope 30. The pulse 71 developed at the control grid of tube 90 by the pulse transformer 70 responsive to the flyback pulse 45 will develop a grid bias across the condenser 21. The flyback pulse 45 is also caused to drive the pulse transformer 93 which produces a negative pulse 95 at the screen grid of the tube 90. This negative pulse 95 has the property of keeping the current through the tube 90 substantially constant during the time that the first control grid of tube 90 draws current due to pulse 71. In addition, as follows from principles described in connection with the circuit of Figure 1, the pulse 95 also reduces or opposes the tendency to develop a voltage drop across the equivalent resistance of the cathode during the time that the first control grid of tube 90 draws current due to pulse 71.

The amplifiers 86, 87 and 88 may perform other functions in addition to amplifying the color difference signals which pass through these amplifiers; for example, filter circuits may be included in these amplifiers for preventing the color subcarrier, the demodulating signal and certain chrominance signal components from being applied to the color kinescope 30. Amplifiers 86, 87 and 88 may also be D.-C. stabilized according to the present invention.

Having described the invention, what is claimed is:

1. In a color television receiver adapted to receive a color television signal including horizontal deflection synchronizing pulses occurring during each scanning retrace interval, a luminance signal, and a chrominance signal, the combination of, means to filter said horizontal deflection synchronizing pulses and selected lower frequency components of said luminance signal from said color television signal to provide said chrominance signal, means to demodulate a color difference signal from said chrominance signal, pulser means to develop pulses of uniform amplitude during each scanning retrace interval, means to add said pulses to said color difference signal to form a combined signal, an electron flow amplifier device having a first and second electron flow control electrode, means to apply said combined signal to said first electron flow control electrode, to cause said first electron control electrode to draw current during the occurrence of said pulses at said first electron flow control electrode and to develop a bias at said first electron flow control electrode responsive to the drawing of said current, and means coupled to said second electron flow control electrode to pulse said second electron flow control electrode to effect a reduction in any increased current through said amplifier device during said pulses.

2. In an electron tube circuit, the combination of, a source of signals representing information, an electron flow device having at least a first electron flow control electrode and an anode, means to develop intermittent pulses of uniform amplitude, means to apply said information signals and also said pulses of uniform amplitude and of a first polarity to said first electron flow control electrode to cause said first electron flow control electrode to draw current during prescribed intervals to establish a bias at said first control electrode derived from the current drawn by said electrode during said intervals, and means to apply pulses of a second polarity which occur during said intermittent pulses to said anode to effect a reduction in any increased current drawn through said electron flow device to said anode during said intervals.

3. In a color television receiver adapted to receive a color television signal including a chrominance signal, the combination of, means to demodulate a first color difference signal from said chrominance signal, an electron tube device having at least a cathode, a first control grid and an anode; a source of flyback pulses, means including a condenser to couple said flyback pulses a first uniform amplitude and polarity and said first color difference signal between said first control grid and said cathode to cause said first control grid to draw current during said flyback pulses and to develop a bias voltage therefrom across said condenser, an output circuit coupled to said anode, means to apply said flyback pulses having a second polarity and a second uniform amplitude in said output circuit to said anode to maintain the electron flow from said cathode during each of said flyback pulses applied to said first control grid constant with respect to the electron current flow from said cathode when no current is drawn by said first control grid.

4. A stabilized color demodulator circuit comprising in combination: means providing a pair of signals consisting of a chrominance signal which only occurs between each scanning retrace interval and a demodulating signal, a demodulator device having a cathode, a plurality of control electrodes and an output electrode, means to develop pulses which occur only during scanning retrace intervals, means to apply a first of said pair of signals and a first polarity of said pulses of a first uniform amplitude between said cathode and a first of said control electrodes whereby said pulses of said first polarity and amplitude cause current to flow in said first of said control electrodes, said applying means including a capacitor connected to said first of said control electrodes and responsive to current flow therein to establish a bias for said electrode, means to apply said second of said pair of signals to a second of said control electrodes, means to apply a second polarity of said pulses of a second uniform amplitude to a third of said plurality of control electrodes to maintain the current flow to said output electrode constant with respect to the current flow to said output electrode between the occurrence of said pulses.

References Cited in the file of this patent

UNITED STATES PATENTS

| | | |
|---|---|---|
| 2,240,600 | Applegarth | May 6, 1941 |
| 2,713,608 | Sonnenfeldt | June 19, 1955 |
| 2,808,455 | Moore | Oct. 1, 1957 |